United States Patent
Killen et al.

(10) Patent No.: US 7,866,132 B2
(45) Date of Patent: Jan. 11, 2011

(54) HARVESTING HEAD REEL SUPPORT ARRANGEMENT INCLUDING HYDRAULIC CYLINDERS AND CONTROL CIRCUITRY

(75) Inventors: Dale H Killen, Port Byron, IL (US); Gordon L. Salley, Moline, IL (US); Benjamin M. Lovett, Colona, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/469,251

(22) Filed: May 20, 2009

(65) Prior Publication Data

US 2010/0293914 A1 Nov. 25, 2010

(51) Int. Cl.
*A01D 41/14* (2006.01)
*A01D 46/08* (2006.01)
*A01D 75/28* (2006.01)

(52) U.S. Cl. .................................. 56/10.2 E
(58) Field of Classification Search ............... 56/10.2 E, 56/DIG. 15, 10.2 R, 14.4, 220, 91, 92, 96, 56/55, 56, 65, 74, 77, 81, 86
See application file for complete search history.

(56) References Cited

U.S. PATENT DOCUMENTS

| | | | | |
|---|---|---|---|---|
| 3,498,035 A | * | 3/1970 | van der Lely et al. | 56/11.9 |
| 3,793,831 A | * | 2/1974 | Khatti | 60/471 |
| 3,842,714 A | * | 10/1974 | Coleman | 91/459 |
| 4,069,650 A | * | 1/1978 | Montanari et al. | 56/221 |
| 4,091,602 A | * | 5/1978 | Williams et al. | 56/14.4 |
| 4,124,970 A | * | 11/1978 | Bernhardt | 56/10.2 E |
| 4,204,383 A | * | 5/1980 | Milliken, Jr. | 56/10.2 E |
| 4,368,609 A | * | 1/1983 | Hutchinson et al. | 56/221 |
| 4,407,109 A | * | 10/1983 | Swanson et al. | 56/11.9 |
| 4,507,910 A | * | 4/1985 | Thornley et al. | 56/10.2 E |
| 4,845,931 A | * | 7/1989 | Bruner et al. | 56/208 |
| 5,261,216 A | * | 11/1993 | Schumacher et al. | 56/14.4 |
| 5,488,817 A | * | 2/1996 | Paquet et al. | 56/10.2 R |
| 5,752,372 A | * | 5/1998 | Buermann | 56/10.2 E |
| 5,768,870 A | * | 6/1998 | Talbot et al. | 56/364 |
| 5,867,972 A | * | 2/1999 | Laumann et al. | 56/126 |
| 6,029,429 A | * | 2/2000 | Fox et al. | 56/10.2 E |
| 6,195,972 B1 | * | 3/2001 | Talbot et al. | 56/364 |
| 6,619,020 B1 | * | 9/2003 | Chaney et al. | 56/10.9 |
| 6,651,411 B1 | * | 11/2003 | Becker et al. | 56/10.2 R |
| 2003/0110749 A1 | * | 6/2003 | Frego | 56/11.9 |
| 2006/0213168 A1 | * | 9/2006 | Remillard et al. | 56/10.2 R |
| 2007/0130898 A1 | * | 6/2007 | Dueckinghaus et al. | 56/10.1 |
| 2007/0204583 A1 | * | 9/2007 | Coers | 56/14.4 |
| 2007/0289278 A1 | * | 12/2007 | Coers et al. | 56/14.4 |

* cited by examiner

*Primary Examiner*—Árpád Fábián-Kovács

(57) ABSTRACT

A harvesting head (104) for an agricultural combine (100) includes a hydraulic height control circuit for controlling the height of the reel (122). The hydraulic height control circuit includes at least two closed hydraulic circuits (124, 134 and 128, 138).

9 Claims, 5 Drawing Sheets

HARVESTING HEAD REEL SUPPORT ARRANGEMENT INCLUDING HYDRAULIC CYLINDERS AND CONTROL CIRCUITRY

FIELD OF THE INVENTION

The invention relates to agricultural combines. More particularly it relates to harvesting heads for agricultural combines. Even more particularly it relates to reels for harvesting heads and hydraulic height control circuits therefore.

BACKGROUND OF THE INVENTION

Harvesting heads for agricultural harvesters are being manufactured in greater and greater widths. As the widths increase, additional means have been provided to support the reels for the harvesting heads.

Traditionally, two arms were used to support the reel for a harvesting head, one disposed at each end of the reel. More recently, three arms have been used to support the reel for a harvesting head, one arm at each end of the reel, and one arm in the middle. In the future, if the widths of harvesting heads further increase, four or more arms may be used to support the reel for a harvesting head.

A problem that has surfaced with the three arm reel support arrangement is the inability to keep all of the arms at the same height above the cutting platform of the harvesting head. The spacing of the reels is very important to ensure that the crop is drawn over the reciprocating knife that extends laterally across the front of the harvesting head.

As the agricultural combine with harvesting head attached is driven through the field, the reel is raised and lowered by the hydraulic height control circuit. The operator does this to maintain the optimum height for the crop it is harvesting. As the agricultural combine travels through the field, the operator will regularly change the height of the reel by signaling the hydraulic height control circuit to either increase the reel height (by raising the three arms upon which it is supported) or decrease the reel height (by lowering the three arms upon which it is supported).

Furthermore, as the agricultural combine travels through the field the harvesting head experiences a significant amount of shaking and vibration which tend to bounce the reel as it travels.

This vibration, bouncing, and regular adjustment of the reel will cause the reel support arms to get out of synchronization. Operators preferred that the reel, and hence the reel support arms be at the same height. If one arm "droops", such as by losing hydraulic fluid in the portion of the hydraulic height control circuit that raises and lowers that arm, it may interfere with the reciprocating knife disposed along the leading edge of the harvesting head.

One solution to this problem has been to provide a hydraulic height control circuit that periodically drives the arms against fixed mechanical stops that hold the arms in the exact same position, and then simultaneously supplements (or bleeds off) the hydraulic fluid in the hydraulic height control circuit for all of the reel support arms. This periodic correction, however, is time-consuming, and requires special modifications to the hydraulic cylinders that are part of the hydraulic height control circuit.

What is needed, therefore, is a hydraulic height control circuit for the reel support arms of a harvesting head of an agricultural combine that will reduce the frequency of calibration of the height of the reel support arms. It is an object to provide such a hydraulic height control circuit, and to provide a harvesting head having such a hydraulic height control circuit.

SUMMARY OF THE INVENTION

In accordance with one aspect of the invention, a harvesting head for an agricultural combine comprises a hydraulic height control circuit for controlling the height of the reel. The hydraulic height control circuit includes at least two closed hydraulic circuits. Each of the at least two closed hydraulic circuits comprises two cylinders in which fluid that is expelled from one of the cylinders is communicated to a second of the cylinders and raises (or lowers, depending upon the arrangement) a reel support arm coupled to the second cylinder.

The harvesting head for an agricultural combine may also comprise a frame, three reel support arms pivotally coupled to the frame, a reel supported on the three arms, and a hydraulic height control circuit comprising three hydraulic cylinders coupled between the frame and the three reel support arms, wherein the hydraulic height control circuit hydraulically isolates the three hydraulic cylinders in three separate hydraulic circuits.

The hydraulic height control circuit may include a first hydraulic cylinder coupled to one of the reel support arms to lift that arm. It may also include two additional hydraulic cylinders coupled to the first hydraulic cylinder (or coupled to the reel support arm that is lifted by the first hydraulic cylinder) to be mechanically driven thereby whenever the first hydraulic cylinder lifts or lowers the reel support arm to which it is mechanically coupled. The two additional hydraulic cylinders are respectively coupled to fifth and sixth hydraulic cylinders that are disposed to lift and lower the second and third reel support arms, respectively.

This arrangement provides hydraulic circuits that lift and lower each of the three reel support arms that are hydraulically isolated. Since there is no hydraulic connection between each of the three hydraulic circuits during normal operation (although there may be a common connection during a synchronization process), no hydraulic fluid can be communicated from one of the three hydraulic circuits to another, such as by leaking across a piston as provided in prior art arrangements.

In another arrangement, the first hydraulic cylinder does not drive any reel support arm directly, but instead collectively drives first, second and third hydraulic cylinders that are respectively coupled to and are disposed to drive fourth, fifth and sixth hydraulic cylinders that in turn are disposed to raise and lower first, second and third reel support arms. In this arrangement, the hydraulic isolation is provided by having three discrete hydraulic circuits, one for each of the reel support arms.

DETAILED DESCRIPTION OF THE PREFERRED EMBODIMENTS

Figure 1:
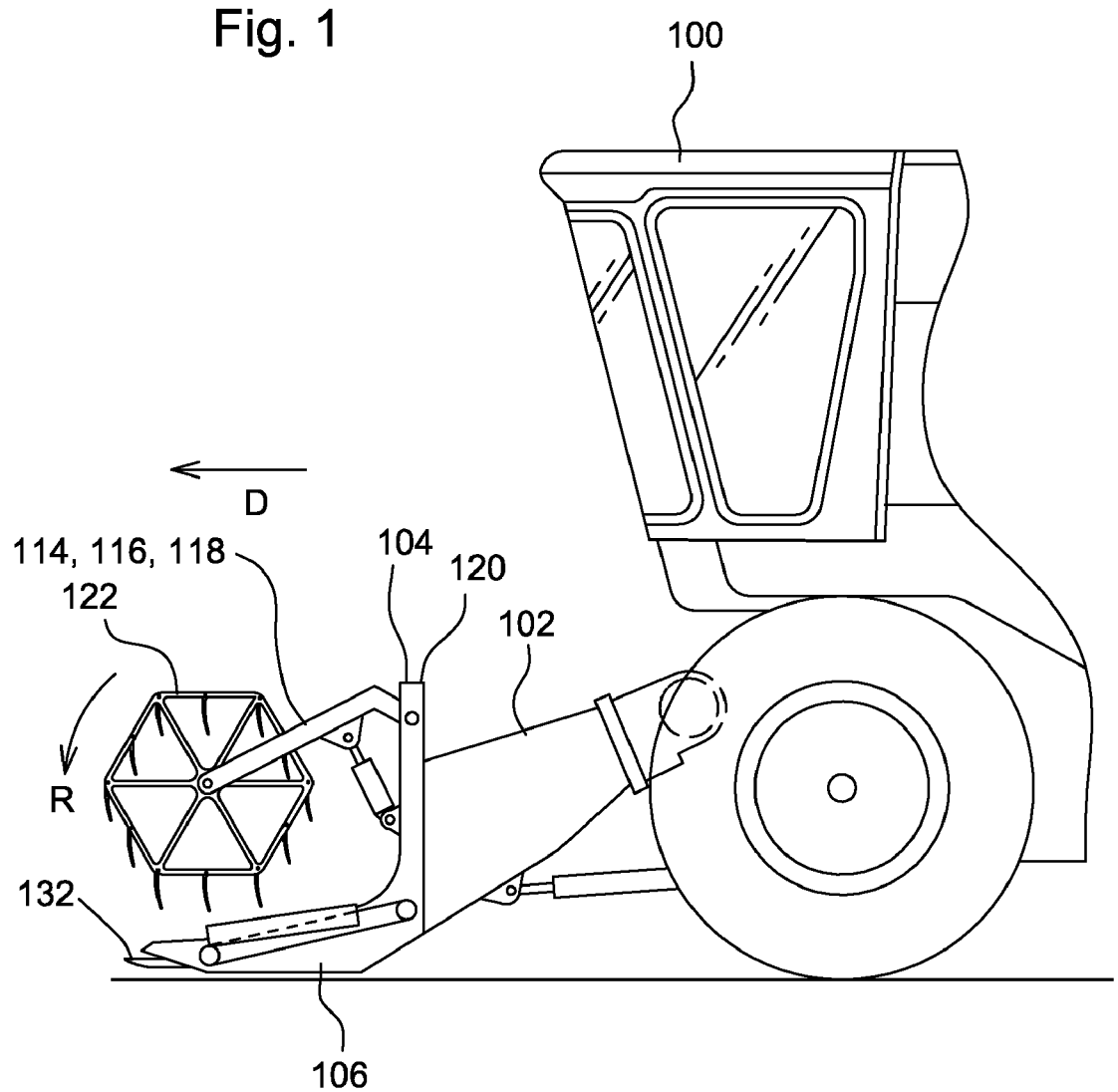
FIG. 1 is a side view of an agricultural combine with harvesting head attached having a hydraulic height control circuit in accordance with the present invention.
Figure 2:
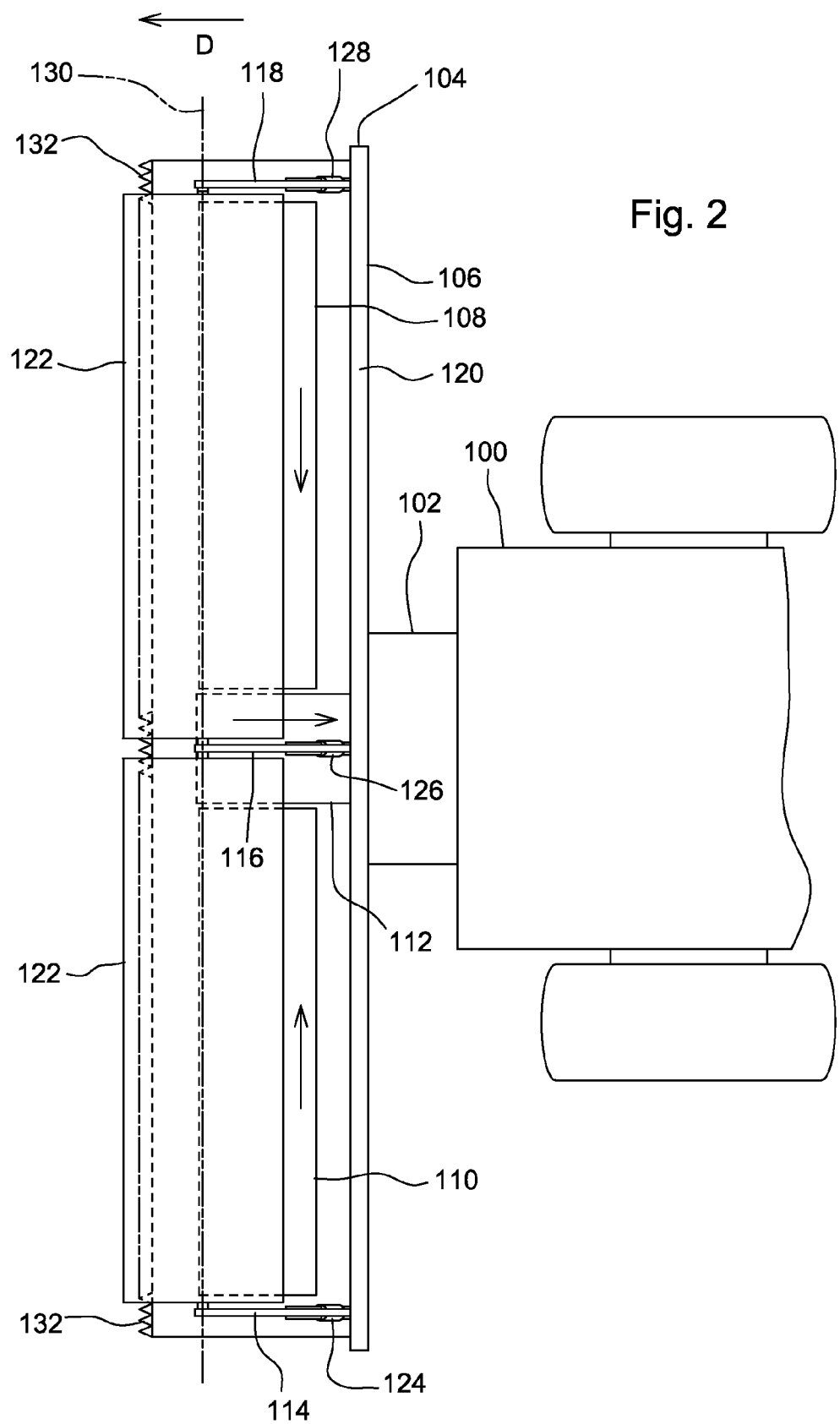
FIG. 2 is a plan view of the agricultural combine with harvesting head of FIG. 1 showing the three reel support arms.

In reference to FIGS. 1 and 2, an agricultural combine 100 moves in a direction of travel "D" over an agricultural field to harvest crops. A feederhouse 102 is fixed to the front of the agricultural combine 100 and is configured to convey cut crop material to agricultural combine 100. Feederhouse 102 supports a harvesting head 104, which extends forward from the agricultural combine 100. Harvesting head 104 is configured to cut crop from the field and to convey it to feederhouse 102 for further conveyance to agricultural combine 100.

Harvesting head 104 includes a frame or chassis 106 that supports two side conveyors 108, 110 that are configured to gather cut crop and convey it to a center conveyor 112 which conveys cut crop material from side conveyors 108 and 110 into feederhouse 102. In a preferred embodiment, side conveyors 108, 110 and center conveyor 112 are endless belt conveyors supported on rollers (not shown) that are driven in rotation by hydraulic motors. In the embodiment illustrated herein, the center conveyor 112 and the side conveyors 108 and 110 are endless belt conveyors. In an alternative arrangement, they may be auger conveyors.

Three reel support arms 114, 116, 118 are pivotally supported from an upper beam member 120 of frame or chassis 106. Upper beam member 120, like frame or chassis 106 extends laterally and horizontally, generally perpendicular to the direction of travel "D". Reel support arms 114, 116, 118 are spaced apart from each other such that two of the arms (114, 118 are disposed to support each end of the reel 122, and one reel support arm 116 is disposed to support the center of reel 122. In the preferred embodiment, they are spaced equidistantly apart, and are driven up and down in synchrony, maintaining the same height of reel 122 across the entire width of the harvesting head 104.

A hydraulic height control circuit includes hydraulic cylinders 124, 126, 128 that are coupled at one end to the frame or chassis 106 and at the other end to reel support arms 114, 116, 118, respectively. As hydraulic cylinders 124, 126, 128 are extended, reel 122 is lifted. As hydraulic cylinders 124, 126, 128 are retracted, reel 122 is lowered.

Reel 122 is disposed to rotate about its longitudinal axis 130 in a direction "R" that draws the upper portions of crop plants into a reciprocating knife 132 that extends across substantially the entire width of the harvesting head 104. Reel 122 supports the upper part of the crop plant as the stalk is cut, causing the crop plant to fall onto side conveyors 108, 110 and center conveyor 112. Once on the conveyors, the cut crop material is drawn into feederhouse 102 and thence to combine 100 for further processing.

Figure 3:
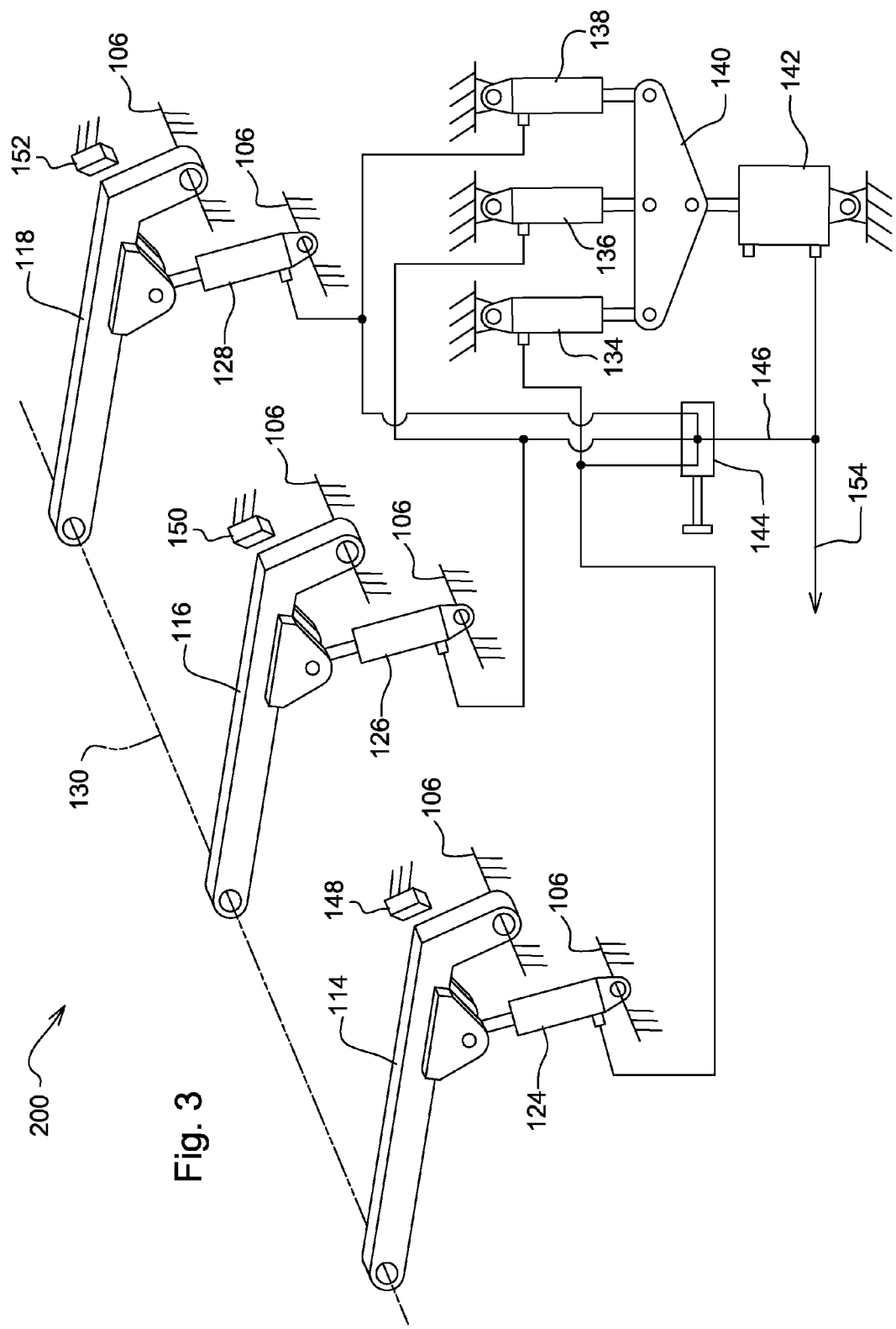
FIG. 3 is a schematic diagram of a first hydraulic height control circuit in accordance with the present invention.

In FIG. 3, hydraulic height control circuit 200 comprises hydraulic cylinders 124, 126,128 that are coupled to and driven by three hydraulic cylinders 134, 136, 138, respectively. Hydraulic cylinders 134, 136, 138, in turn are driven by mechanical means, and are not in hydraulic fluid communication with each other. This mechanical means includes a mechanical member 140 which communicates the movement of another hydraulic cylinder 142 to each of cylinders 134, 136, 138, driving all three of them substantially simultaneously. Whenever hydraulic cylinder 142 drives cylinders 134, 136, 138, it causes all of them to rise and fall (and hence reel 122 to rise and fall) in synchrony.

Cylinders 124 and 134 together form a closed hydraulic circuit during normal field operations as do cylinders 126 and 136, and cylinders 128 and 138. During normal field operations, hydraulic cylinder 142 is alternatively extended and retracted to raise and lower reel support arms 114, 116, 118 in synchrony. This extension and retraction of hydraulic cylinder 142 occurs whenever the operator sends fluid into or withdraws fluid from hydraulic conduit 154.

Figure 5:
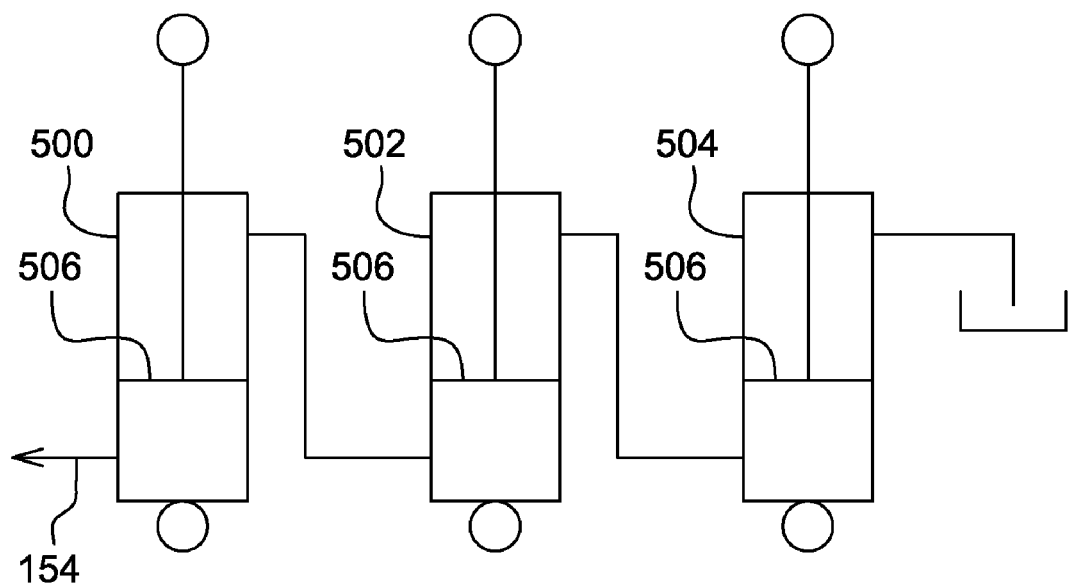
FIG. 5 is a schematic diagram of a prior art hydraulic height control circuit that suffers from the problems described herein.

As compared to the prior art hydraulic height control circuit shown in FIG. 5 herein, each of the closed hydraulic circuits for each of the control arms is hydraulically isolated from the other during normal operation in the field. They are temporarily coupled together only during the synchronization process when the agricultural combine is not harvesting. The synchronization process employs a synchronization circuit to ensure that the individual closed hydraulic circuits are replenished with the appropriate amount of hydraulic fluid to bring them to the same height.

This temporary coupling during height synchronization is provided by a synchronization circuit comprising a manual bypass valve 144 and associated circuitry, which is actuated by the operator when the operator wishes to synchronize the reel support arms. When actuated, manual bypass valve 144 conducts hydraulic fluid under pressure from a hydraulic supply line 146 into each of the parallel closed hydraulic circuits described above.

When manual bypass valve 144 is actuated, hydraulic fluid will flow into each of the circuits, raising each of the reel support arms 114, 116, 118 until they contact their respective mechanical stops 148, 150, 152. The stops are arranged such that the reel support arms 114, 116, 118 hold the reel at a predetermined height at all three reel support arms.

Typically, stops 148, 150, 152 will be mechanical stops preventing any further upward movement of the reel support arms 114, 116, 118, respectively. They define the uttermost height of the reel 122. Mechanical stops 148, 150, 152 can be external to the cylinders, as shown here, or they can be internal to the cylinders. In the internal case, mechanical stops 148, 150, 152 are the ends of the cylinders against which the piston abuts when it reaches its fully extended or fully retracted positions.

Once the heights of the arms have been synchronized, the operator releases manual bypass valve 144, which then isolates each of the closed hydraulic circuits from the other.

Figure 4:
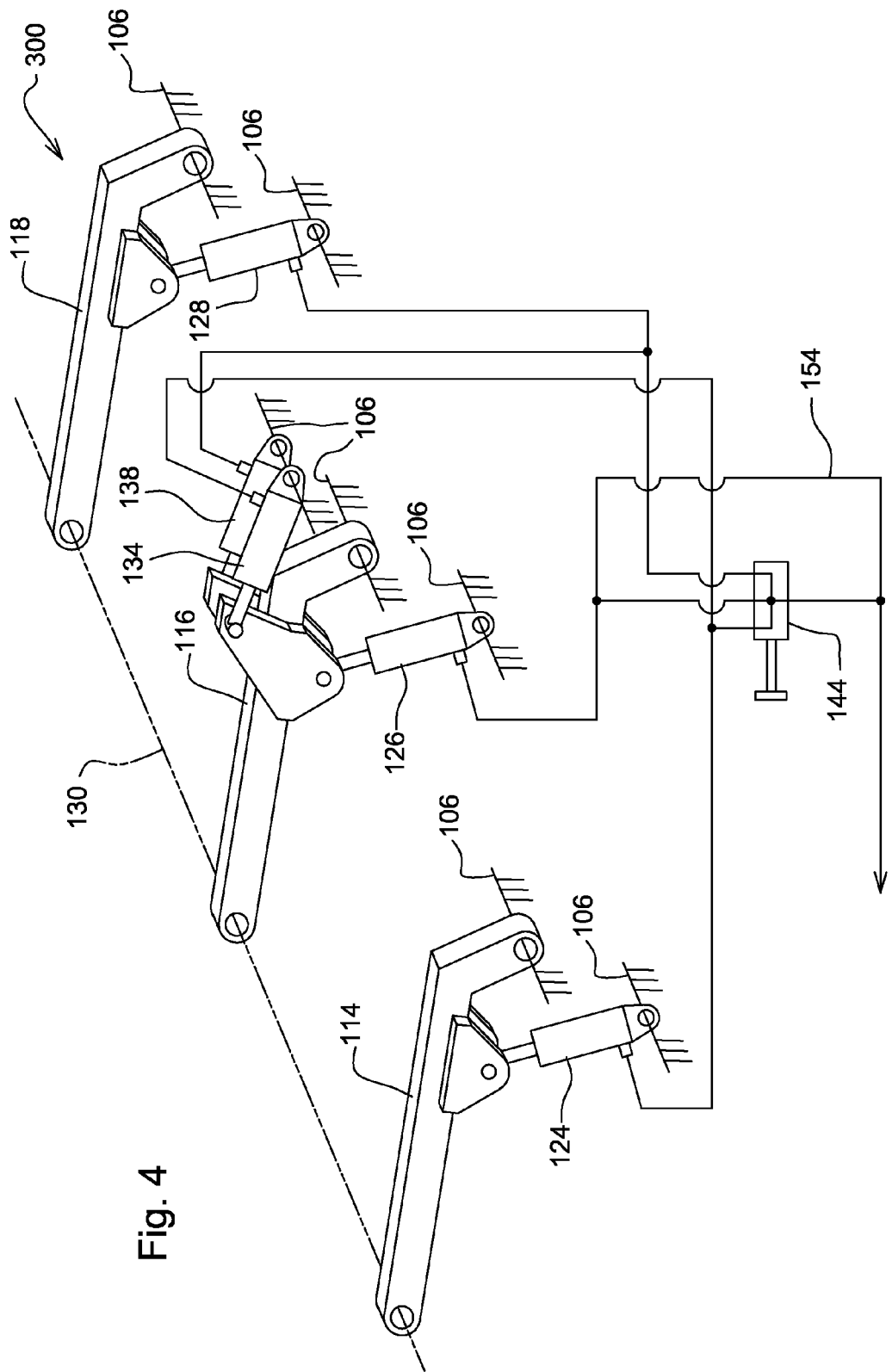
FIG. 4 is a schematic diagram of a second hydraulic height control circuit in accordance with the present invention.

Referring now to FIG. 4, a second hydraulic height control circuit 300 is illustrated which provides the same hydraulic isolation as the embodiment of FIG. 3, but requires two fewer hydraulic cylinders.

In the arrangement of FIG. 4, the operator sends hydraulic fluid into, or withdraws hydraulic fluid from, hydraulic conduit 154 as in the previous example in order to raise or lower reel 122, respectively.

Unlike the previous example, however, hydraulic fluid is applied directly to hydraulic cylinder 126, which (as in the previous example) is coupled to reel support arm 116 to raise and lower it. Unlike the previous example, hydraulic cylinders 134 and 138 are mechanically coupled to hydraulic cylinder 126 such that they are retracted whenever hydraulic cylinder 126 extends and lifts reel support arm 116. When hydraulic cylinders 134, 138 are retracted, they eject hydraulic fluid which is carried through hydraulic conduits to hydraulic cylinders 124, 128, respectively. Cylinders 124, 134 are part of a closed hydraulic circuit during normal operation. Cylinders 128, 138 are also part of a closed hydraulic circuit during normal operation. Hydraulic cylinder 126, which is driven directly by pressure fluid being sent into or withdrawn from hydraulic conduit 154, is also part of a closed hydraulic circuit during normal operation.

As in the previous example, the three hydraulically isolated circuits are temporarily coupled during height synchronization by actuation of manual bypass valve 144 in the identical matter as described above in conjunction with FIG. 3.

FIG. 5 illustrates a prior art hydraulic height control circuit for reel 122 in which the elements are not hydraulically isolated and which suffers from the prior art problems described herein. In this arrangement there are three hydraulic cylinders 500, 502, 504 that are coupled together to be driven by hydraulic fluid under pressure supplied by hydraulic conduit 154. Hydraulic cylinders 500, 502, 504 are in turn coupled to and between the reel support arms 114, 116, 118, respectively, and the framework chassis 106.

Each of the cylinders 500, 502, 504 is a dual ported cylinder having both an extend and a retract port. Whenever hydraulic fluid is injected into hydraulic conduit 154, hydraulic fluid fills the extend port of hydraulic cylinder 500, extending hydraulic cylinder 500 and raising the reel support arm 114 to which it is coupled. A corresponding amount of hydraulic fluid is ejected from the retract port of hydraulic cylinder 500 as the piston 506 in hydraulic cylinder 500 moves.

The fluid ejected from the retract port of hydraulic cylinder 500 is coupled to the extend port of hydraulic cylinder 502, which receives the ejected fluid, displacing piston 506 of cylinder 502 an equivalent amount to piston 506 of cylinder 500, thereby raising the support arm 116 to which it is coupled an equivalent distance and also ejecting an equivalent volume of fluid from the retract port of cylinder 502.

The fluid ejected from the retract port of hydraulic cylinder 502 is coupled to the extend port of hydraulic cylinder 504, which receives the ejected fluid, displacing piston 506 of cylinder 504 an equivalent amount to pistons 506 of cylinders 500, 502, thereby raising the support arm 118 to which it is coupled an equivalent distance to that of support arms 114, 116 and also ejecting an equivalent volume of fluid from the retract port of cylinder 504.

In this manner, all three cylinders 500, 502, 504 are simultaneously extended and retracted. Their hydraulic circuits are not independent, however, but are cross connected, such that hydraulic fluid from one cylinder 500, 502, 504 is communicated to another cylinder 500, 502, 504.

In practice, given the fluid coupling between adjacent cylinders, hydraulic fluid leaks past the pistons 506 in cylinders 500, 502, 504 continuously, causing the cylinders to relatively rapidly differ in their degree of extension, and thus to cause their respective reel support arms 114, 116, 118 to vary in their vertical positions such that one is higher or lower than another. In a system such as this in which the hydraulic circuits for the cylinders are hydraulically coupled together with moving sealing elements (i.e. the pistons, rings, and seals) the sealing is less than perfect. Because of the significant hydraulic pressure on both sides of the piston, and because of the agricultural combine being driven through the field bouncing up and down, the pressures on both sides of the pistons fluctuate drastically, and as a result the seals on the pistons 506 seal inadequately thereby permitting excessive leakage across the pistons 506.

The invention is not limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

The invention claimed is:

1. A harvesting head for an agricultural combine, the harvesting head comprising:
   a frame (106) that extends laterally and has a leading edge;
   a conveyor means (108, 110, 112) mounted on the frame (106) to carry cut crop to a feederhouse (102) of the agricultural combine;
   a reciprocating knife (132) fixed to a leading edge of the frame (106);
   a reel (122) disposed above the reciprocating knife (132) to convey crop material to the conveyor means (108, 110, 112);
   at least first, second and third reel support arms (114), (116) and (118), respectively, being coupled between said frame (106) and said reel (122);
   at least first and second hydraulic cylinders (124) and (128), respectively, having first ends pivotally coupled to first and a second ones (114, 118) of said reel support arms (114, 116, 118) and having second ends pivotally coupled to said frame (106) to support and vertically position the reel (122);
   at least a third hydraulic cylinder (134) and a fourth hydraulic cylinder (138); and
   a hydraulic height control circuit comprising at least first and second closed hydraulic circuits respectively including said third hydraulic cylinder (134) being hydraulically coupled to said first hydraulic cylinder (124) for effecting extension and retraction of said first hydraulic cylinder (124), and including said fourth hydraulic cylinder 138 being hydraulically coupled to said second hydraulic cylinder (128) for effecting extension and retraction of said second hydraulic cylinder (128), with said extension and retraction of said first and second hydraulic cylinders (124) and (128), respectively effecting raising and lowering of said first and second ones (114) and (116) of the first, second and third reel support arms (114, 116, 118).

2. The harvesting head of claim 1, wherein said third and fourth hydraulic cylinders (134, 138) are driven by a mechanical member (140 or 116).

3. The harvesting head of claim 1, further comprising a third closed hydraulic circuit including a fifth hydraulic cylinder (126) having a first end coupled to said third reel support arm (116) and a second end coupled to said frame (106), and a sixth hydraulic cylinder 136 being hydraulically coupled to said fifth hydraulic cylinder, with said third closed hydraulic circuit being configured for effecting extension and retraction of said fifth hydraulic cylinder (126) upon retraction and extension of said sixth hydraulic cylinder (136) to respectively raise and lower said third reel support arm (116); and said third reel support arm (116) being disposed at the center of the harvesting head.

4. The harvesting head of claim 3, wherein said first and second ones (114, 118) of said first, second and third reel support arms (114, 116, 118) are respectively disposed at right and left ends of the harvesting head; and said first and second hydraulic cylinders (124) and (128), respectively, of said first and second closed hydraulic circuits being disposed to raise and lower said first and second ones (114, 118) of said first, second and third reel support arms.

5. The harvesting head of claim 3, wherein the hydraulic height control circuit further comprises a further hydraulic cylinder (142) mechanically coupled to said second, fourth, and sixth hydraulic cylinders for simultaneously and mechanically driving each of said second, fourth and sixth hydraulic cylinders respectively of said first, second and third closed hydraulic circuits.

6. The harvesting head of claim 1, wherein the hydraulic height control circuit further comprises another hydraulic cylinder (142 or 126) mechanically coupled to said second and fourth hydraulic cylinders for simultaneously and mechanically driving each of said second and fourth hydraulic cylinders respectively of said first and second closed hydraulic circuits.

7. The harvesting head of claim 6, wherein said another hydraulic cylinder (126) is coupled to a third (116) of the three reel support arms (114, 116, 118) and the frame (106) to raise and lower the third (116) of the three reel support arms (114, 116, 118).

8. The harvesting head of claim 1, further comprising a synchronizing circuit hydraulically coupled between a source of fluid pressure and said first and second closed circuits and being configured to temporarily and substantially simultaneously couple said first and second closed hydraulic circuits respectively including said first and third hydraulic cylinders (124) and (134), and said second and fourth hydraulic cylinders (128) and 128 to a source of hydraulic fluid under pressure in order to replenish the hydraulic fluid in said first and second closed hydraulic circuits.

9. The harvesting head of claim 8, wherein the synchronizing circuit is configured to drive each of the first and second reel support arms (114, 118) to an extreme position at which each of the first and second reel support arms is mechanically stopped from further movement.

* * * * *